US009513058B2

(12) United States Patent
Hammerich

(10) Patent No.: US 9,513,058 B2
(45) Date of Patent: Dec. 6, 2016

(54) GRATE COOLER FOR A CEMENT CLINKER KILN

(75) Inventor: Jörg Hammerich, Neustadt (DE)

(73) Assignees: IKN GmbH, Neustadt (DE); INGENIEURBURO-KUHLERBAU-NEUSTADT

( * ) Notice: Subject to any disclaimer, the term of this patent is extended or adjusted under 35 U.S.C. 154(b) by 458 days.

(21) Appl. No.: 13/560,643

(22) Filed: Jul. 27, 2012

(65) Prior Publication Data

US 2013/0045454 A1 Feb. 21, 2013

(30) Foreign Application Priority Data

Aug. 16, 2011 (DE) ........................ 10 2011 080 998

(51) Int. Cl.
*C04B 7/47* (2006.01)
*F27D 15/02* (2006.01)

(52) U.S. Cl.
CPC .................................. *F27D 15/022* (2013.01)

(58) Field of Classification Search
CPC ............. F27D 15/022; F27D 15/0213; F27D 2015/0233; F27D 2015/0226; F27D 2015/024; F27D 2015/0253; F27D 2015/026; F27D 15/0266; F27D 15/028; F27D 15/0273; C04B 7/475; F27B 21/02; F23H 17/02; F23H 17/00; F23H 2700/008; F23H 2700/009; F23H 13/08; F23H 13/00
USPC ............. 432/77, 78; 126/179, 181; 198/853; 110/300
See application file for complete search history.

(56) References Cited

U.S. PATENT DOCUMENTS 6,290,493 B1 * 9/2001 Pirard et al. .................... 432/77
8,132,520 B2 3/2012 von Wedel
2008/0263888 A1 * 10/2008 von Wedel ...................... 34/236

FOREIGN PATENT DOCUMENTS

| | | | | |
|---|---|---|---|---|
| CH | 700197 | B1 | * | 7/2010 |
| CN | 1072487 | A | | 5/1993 |
| CN | 2727170 | Y | | 9/2005 |
| CN | 2786111 | Y | | 6/2006 |
| DE | 4103866 | A1 | | 8/1992 |
| DE | 10117225 | A1 | * | 10/2002 |
| DE | 102007019530 | A1 | | 10/2008 |
| EP | 0167658 | A1 | | 1/1986 |
| EP | 0219745 | A1 | * | 4/1987 |
| EP | 1103762 | A1 | * | 5/2001 |
| EP | 1992897 | | | 11/2008 |

OTHER PUBLICATIONS

Bronstein, "Taschenbuch de Mathematik", 1993, Verlag Harry Deutsch Frankfurt, pp. 174.

* cited by examiner

*Primary Examiner* — Steven B McAllister
*Assistant Examiner* — Steven Anderson, II
(74) *Attorney, Agent, or Firm* — Yakov Sidorin; Quarles & Brady LLP

(57) ABSTRACT

A cooling grate, for cooling and transporting of cement clinker having at least one grate element with at least one support for cement clinker, having at least one cooling air channel discharging into the support which is inclined in conveying direction at least in a section adjacent to its outlet used to inject cooling air into the clinker has improved cooling characteristics if the cooling air channel is curved in conveying direction in at least a section adjacent to the outlet.

14 Claims, 6 Drawing Sheets

GRATE COOLER FOR A CEMENT CLINKER KILN

CROSS-REFERENCE TO RELATED APPLICATIONS

This application claims benefit of and priority from co-assigned German Patent Application No. DE 10 2011 080 998.8 filed on Aug. 16, 2011. The disclosure of this German Patent Application is incorporated herein by reference in its entirety.

TECHNICAL FIELD

The present invention relates to a cooling grate for cooling and transporting of cement clinker and grate segments used to form such cooling grate.

BACKGROUND ART

A cement clinker, in the following referred to as a clinker, for short, is typically produced in a sintering process in so called rotary kilns. A clinker is discharged from the rotary kiln with a temperature of about 1450° C. onto an inlet distribution in the form of a bulk material bed, also known as a clinker bed. The clinker is then moved onto a grate cooler where it is cooled by cooling air and transported from the kiln to further processing stages, usually at first to a crusher. During this transport, a temperature exchange between hot clinker and cooling air takes place. The higher the resulting temperature of the cooling air, the more efficiently the contained heat can be reused as process heat in the kiln. Typical bed depths of the clinker bed are between about 0.4 m and about 0.8 m.

A typical grate cooler has at least one cooling grate having at least one support for the clinker. Cooling air is injected into said cooler via cooling air channels. The cooling air is used to transport the fine fraction of the bulk material bed upward allowing the cooling air to pass through the interstices between the larger particles undisturbed. This facilitates efficient cooling of the larger particles. Turmoil and stirring of the bulk material particles must be avoided, as this would result in a homogeneous temperature across the bed height. The desired bulk material bed temperature increases with the distance from the support, as the maximum cooling air temperature is governed by the temperature of the bulk material particles at the top of the material bed. Due to radiation losses at the surface, this optimum temperature profile cannot be realised, so the aim is to have the hottest section of the bulk material bed a few centimeters underneath the surface.

In order to achieve a uniform aeration, EP 0167 658 teaches a step grate having box-like grate elements, arranged in rows in parallel to each other, transversal to the conveying direction. The rear part of each row is overlapped by the front part of the preceding row (in conveying direction), thereby forming a structure resembling a stair, each step constituted by grate elements arranged side by side. Each grate element has several slot-like cooling air channels, arranged consecutively transversely to the conveying direction. The cooling air channels are constituted by gaps between grate segments, which are inserted in box-like carriers of the grate elements. The upper segments of the cooling air channels are straight and inclined in conveying direction, so that the cooling air exits the cooling air channels at an angle inclined in conveying direction and at least a noteworthy fraction of the cooling air flows along the support. The lower part of the slot-like cooling air channels is syphon-shaped, to prevent clinker from falling through the cooling air channels.

U.S. Pat. No. 8,132,520 discloses a grate cooler having multiple planks adjacently situated transverse to the direction of transport and operationally moved longitudinally relative to one another with moving gaps designed as blow openings situated therebetween. The planks form a grate floor. Cooling air is blown through the moving gaps into the bulk material on top of the planks. The upper parts of the moving gaps are straight and inclined in the direction of transport. The lower parts of the moving gaps are siphon-shaped.

SUMMARY OF THE INVENTION

The present invention stems from the realization that the discharge of the fine fraction from the bulk material bed is not sufficiently effected with the step grate according to the prior art. When the cooling air supply is below a critical value of about 0.75 $m^3$/s per $m^2$ of support area (reduced 0.75 m/s), the fine fraction may not be discharged reliably. This improves with increased aeration, however, this improvement is accompanied by an increase in formation of air tunnels, which reduces efficiency and temperature of the cooling air above the clinker. Above about 1.5 m/s of cooling air supply the particles are lifted and swirled inside the bulk material bed.

The problem to be solved by the invention is to reliably discharge the fine fraction of the clinker bed at the lowest possible aeration, in order to enable a good heat transfer between the clinker bed and the cooling air at low pressure drop.

The solution to this problem is described by the independent claims. The cooling grate as described in claim 1 can be equipped with grate segments as described in claim 11. In particular, it can be equipped with box-like grate elements, in which grate segments according to claim 11 are inserted. The dependent claims relate to further improvements of the invention.

The cooling grate for cooling and transporting of cement clinker has at least one support for cement clinker. This can preferably be the surface of a grate element or part thereof. During transport, the clinker is moved across the support. Hence, the support lies in the same plane as the conveying direction. Strictly speaking, this is only the case for flat supports. However, the orientation of undulated supports also defines the conveying direction at least substantially. In this context "undulated" stands for a surface which is made up of a multitude of wavelike ridges arranged in parallel to each other. For the sake of simplicity it is assumed, in the context of this application, that the support is located in a horizontal plane. Preferably however, the support is slightly inclined in conveying direction to support the transport of the clinker bed. At least one cooling air channel for injecting cooling air into the clinker ends in the support surface, i.e. cooling air may be blown via the cooling air channel into the clinker bed on the support. In a section adjacent to the outlet of the cooling air channel said channel is inclined in conveying direction. The fact, that at least the section of the cooling air channel adjacent to the outlet is curved, leads to the effect that the cooling air stream attaches to the support by the Coanda-effect better than is the case with known grate coolers. So the cooling air is first directed in conveying direction until it hits clinker particles, which deflect it upwards. As the clinker particles do not resemble a wall, but are distributed across the support in granular form, only a part of the cooling air is deflected in an upward direction in each section. As a result, it is possible to create a reliable and comparatively homogeneous aeration of the clinker bed over a comparatively long distance from the outlet of the cooling air channel. Furthermore, the transport of the bulk material bed is supported by the cooling air stream, being at least approximately parallel to the support or conveying direction respectively. The agitation of the clinker bed by the cooling air is less than in coolers with known cooling air channels. This results in better formation of the desired temperature gradient inside the clinker bed.

Furthermore, as a result of the curvature of the cooling air channel, the speed of the cooling air can be kept constant to the greatest possible extent, at least along the curved part, although the air, normally entering from below, is deflected in the conveying direction. This is especially true, if the cross section of the cooling channel is, at least in the curved part, approximately (±10%) constant.

In a preferred embodiment of the invention, the curvature at the transition from the cooling air channel to the support is steady, which supports the Coanda-effect particularly well, so that the predominant portion of the cooling air follows the transport direction of the clinker.

The best way to determine the curvature of the cooling air channel in conveying direction is by using the resulting line of a preferably vertical section of the cooling air channel. This section will be made through a plane containing a vector indicating the conveying direction. The curvature of a curve (or line) in a point M is the limit of the ratio of angle δ between the positive tangent directions in point M and a point N on the line (see Bronstein "Taschenbuch der Mathematik", Verlag Harry Deutsch Frankfurt a. M., 1. Aufl. 1993, s. 174).

The Coanda-effect is especially supported, when the curvature decreases in the direction to the support. This is particularly the case, when the change in curvature of a section of the cooling air channel adjacent to the outlet decreases.

The cooling air channel preferably resembles a slot. It is bordered by walls in conveying direction and against conveying direction. The distance between the walls is preferably substantially constant (with possible deviation of about ±10%), at least in the section adjacent to the outlet of the cooling air channel. As a result, turbulences are reduced which could endorse the dissolution of the cooling air stream from the support and so counteract the Coanda-effect.

In a preferred embodiment the support has at least one longitudinal slit open to the top and connected to the cooling air channel. This causes an especially large-area injection of cooling air into the clinker bed located on top of the support. As a result, the cooling air temperature above the clinker bed is increased and the risk of the formation of air tunnels is decreased. Furthermore, the required fan power for an adjusted amount of cooling air is decreased.

When the depth of the longitudinal slit decreases with increasing distance from the cooling air channel, the speed of the cooling air can be kept so high that the fines are reliably blown out, even at the far end of the slit. Clogging of the longitudinal slit is thus avoided.

Particularly preferable the longitudinal slit branches off the cooling air channel in the conveying direction. This also results in a particularly homogeneous injection of cooling air into the clinker bed, because the stream of cooling air guided over the support picks up the cooling air in the longitudinal slit in conveying direction, leading to the advantages listed above.

Preferably, the longitudinal slit has a bottom that leads into the cooling air channel in a steadily curved manner. This also serves to homogenise the cooling air stream and reduce swirls, which would increase the flow resistance.

Preferably the cooling grate has several longitudinal slits, arranged in parallel to each other. The distance between these longitudinal slits should preferably be less than the medium distance of the clinker particles (without taking the fine fraction into account). The width of the longitudinal slits should be chosen so that, depending on the amount of cooling air through the longitudinal slits, at least most of the clinker particles that might drop into a longitudinal slit are blown out by the cooling air.

In a preferred embodiment, the inlet of the cooling air channel widens, i.e. its cross-section increases in a section adjacent to the inlet in the direction to the inlet opening. This reduces the cooling air speed at least, in said section at the inlet side or the inlet respectively, which in turn effects a reduction of the differential pressure required for a certain flow through the cooling air channel.

It is particularly simple to manufacture the cooling air channels as described above, if the cooling grate is equipped with grate segments having at least a support for cement clinker, a front side in conveying direction and a rear side facing away from the front side, with the front and rear sides are each formed by an area which are curved in conveying direction in at least in a segment adjacent to the support. Such grate segments can be located sequentially, for instance in a grate element, where a cooling air channel is created by the slot that is formed between subsequent front and rear sides of the grate segments. This slot is inclined and curved in conveying direction at least in the section adjacent to the outlet, which causes the cooling air flowing through the slot to attach to the support by the Coanda-effect. The cooling air channel is laterally bordered by the side walls of the grate element. Preferably the slot is much wider than thick, i.e. the distance between the lateral borders is substantially larger than the distance between two subsequent grate segments.

Preferably at least one segment of the front side adjacent to the support is congruent to a segment on the rear side. This allows for the formation of cooling air channels with at least segment-wise constant cross-section.

Preferably the curvature on the rear side is steady, at least at the transition to the support, to support the Coanda-effect.

When the curvature of the rear side increases with the distance from the support in a section adjacent to said support, the cooling air flow attaches to the support particularly well.

Particularly preferable, the alteration of the curvature of the rear side in a segment adjacent to the support decreases with the distance to the support.

Preferably the grate segment has at least one guide element on each side, to insert it into guide profiles of a box-like grate element. This allows for easy exchange of the grate segments.

Preferably the grate segment has at least one projection at the front and/or the rear side, used as a distance piece to a grate segment located in front or behind the grate segment respectively, thereby forming a slot-like cooling air channel in between two adjacent grate segments.

Preferably the distance between the bottom side and a plane defined by the support decreases in the direction to the front side. Particularly preferable, the distance decreases monotonic, especially strictly monotonic. This decreases the formation of swirls in the area of the inlet of the cooling air channel formed by two subsequent grate segments.

BRIEF DESCRIPTION OF THE DRAWINGS

In the following, the invention will be described by way of example, without limitation of the general inventive concept, on examples of embodiment and with reference to the drawings.

Figure 1:
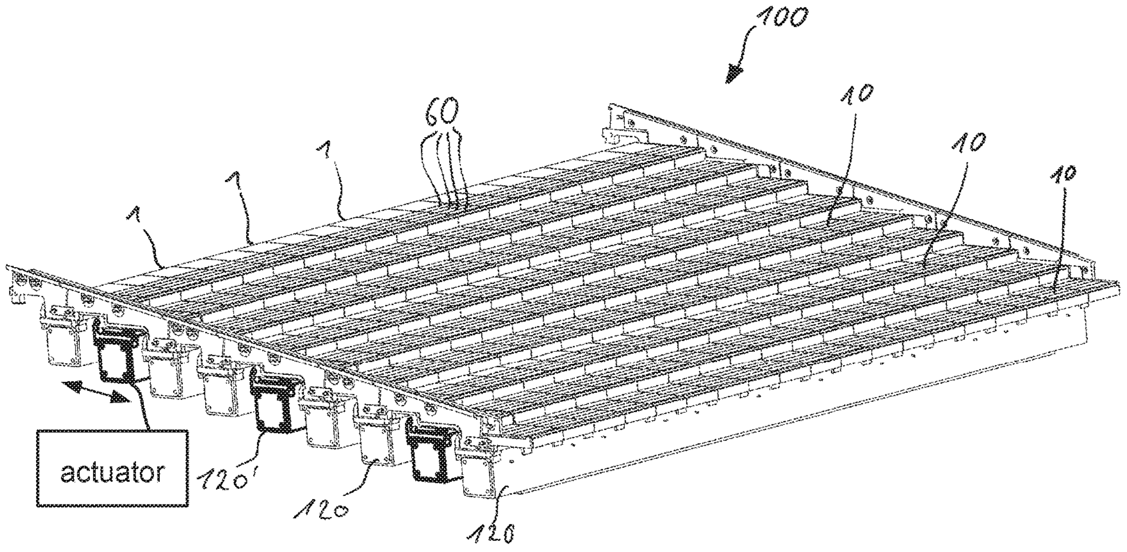
FIG. 1 shows a cooling grate.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The cooling grate 100 in FIG. 1 has a multitude of grate elements 1 arranged in rows. The rows are made up of grate elements 1 arranged side by side on cross beams 120. The grate elements are supplied with cooling air through the cross beams 120. The cross beams are therefore also referred to as "air beams". The air beams 120 are arranged one after another so that the front section of one row of grate elements overlaps the rear section of the row in front of it. The surface of the cooling grate thus resembles a stair. In order to transport clinker located on top of the cooling grate, some of the air beams 120' (highlighted in bold) are movable in parallel to the support 10 formed by the grate elements 1. The respective air beams 120' can be moved forward and backward by an actuator (not shown).

Figure 2:
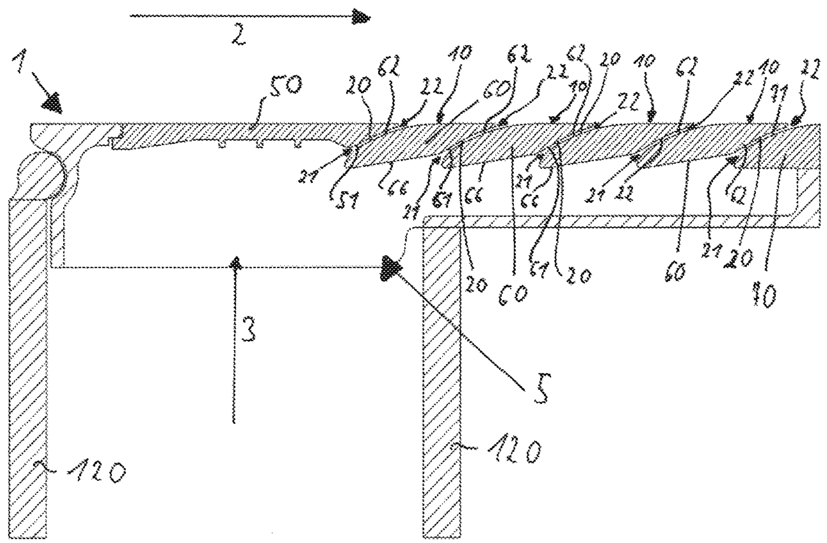
FIG. 2 shows a longitudinal sectional view of a grate element.
Figure 5:
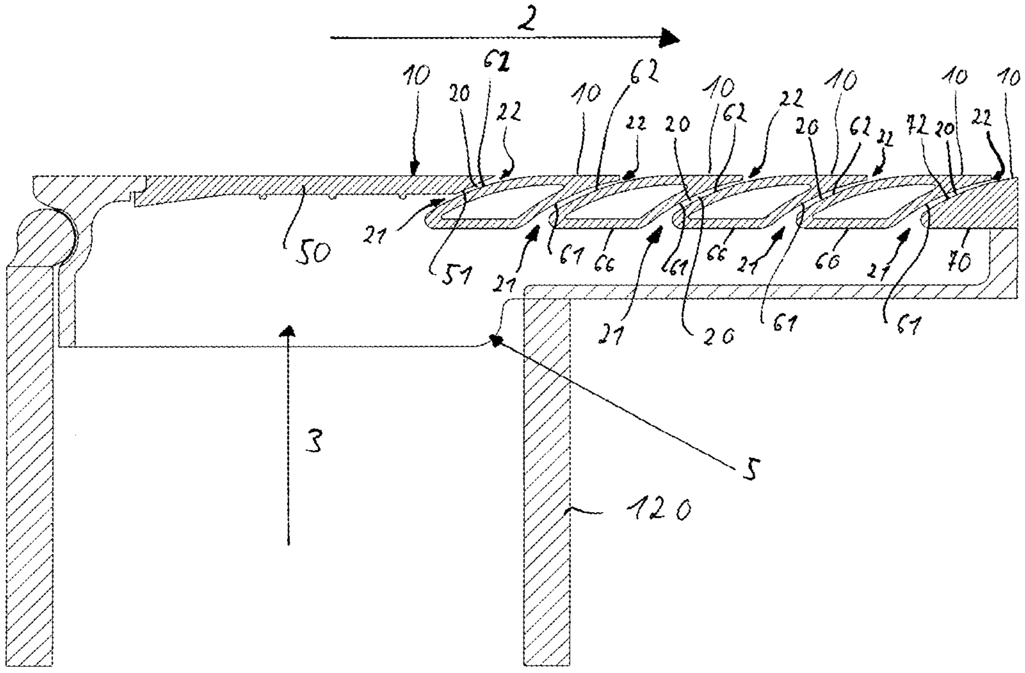
FIG. 5 shows a longitudinal sectional view of another grate element.

FIGS. 2 and 5 each show a longitudinal section of a grate element 1 located on top of an air beam 120. The grate element 1 has a partly flat surface as support 10 for a clinker bed (not shown). The conveying direction of the clinker bed is indicated by an arrow 2. The support 10 is formed substantially by a plate 50, grate segments 60 and front segment 70. In assembled condition, the plate 50 constitutes a final segment which is overlapped by the bottom side of a grate element 1 arranged behind it. A multitude of grate segments 60 and a front segment 70 follow the plate 50 in the conveying direction 2. Slots 20, arranged at a right angle to the conveying direction 2 and used as cooling air channels 20, are formed between plate 50, grate segments 60 and front segment 70. Consequently the flow through the cooling air channels 20 is defined, at least substantially, by the front sides 51, 61 and rear sides 62, 72 of the plate 50, the grate segments 60 and the front segment 70 respectively, as well as the distance between the respective front and rear sides.

For cooling the clinker bed cooling air can be injected into the grate element 1 through an opening 5 in the lower side 6 of the grate element 1 via the air beam 120 (indicated by arrow 3). The cooling air exits from at the upper side 7 of the grate element 1 through the cooling air channels 20. Consequently, the cooling air channels 20 have an inlet 21 on the lower side and an outlet 22 in the support 10 (see also FIG. 2 and FIG. 5). The cooling air channels 20 each have a section 24, adjacent to the outlet 22, extending in direction to the inlet, which is inclined and curved in conveying direction. The inclination of the cooling air channels 20 thus increases in the conveying direction. As a consequence "cooling air jets" exiting from the cooling air channels 20 attach to the support 10 at least initially. This is clearly visible in FIG. 7, which shows the flow conditions compared to the prior art (above according to the present invention, below according to the prior art). This improved attaching of the cooling air to the support is especially supported by the fact that the rear sides 62 of the grate segments 60 run over into the adjacent plane sections of the support 10 in steadily curved manner (see FIGS. 3, 4 and 6). Furthermore, the curvature decreases steadily with increasing distance to the support 10. As a consequence, the part of the support 10 which is not flat is only slightly inclined. The sections of the cooling air channels 20 adjacent to the outlet 22 are only slightly inclined as well. Therefore it is impossible for clinker particles to fall down against the flow of cooling air exiting the cooling air channels. The so-called "syphon" required in prior art coolers (see FIG. 7, lower illustration) can therefore be omitted. This also reduces the flow resistance of the grate element 1 and consequently the power draw of the cooling air fans. Omitting the syphon sections of the cooling air channels 20 also facilitates a more uniform inflow into the inlets 21 of the cooling air channels. Correspondingly the cooling air exits the cooling air channels more uniformly than is the case with prior art grate elements, as can be clearly seen in FIG. 7. This uniformity significantly reduces the probability of formation of air tunnels at a given cooling air flow through the clinker bed.

Figure 3:
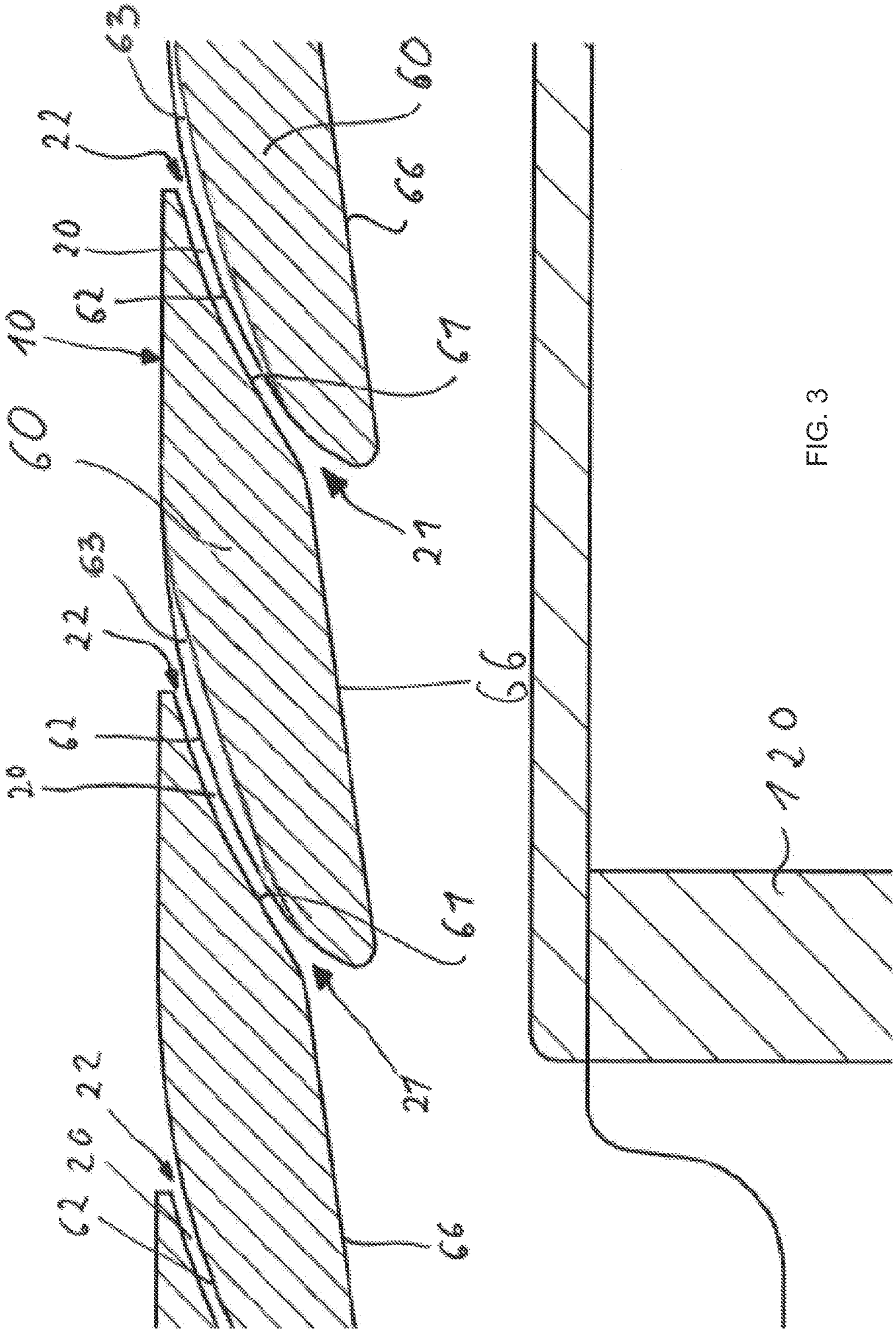
FIG. 3 shows a detail of FIG. 2.
Figure 4:
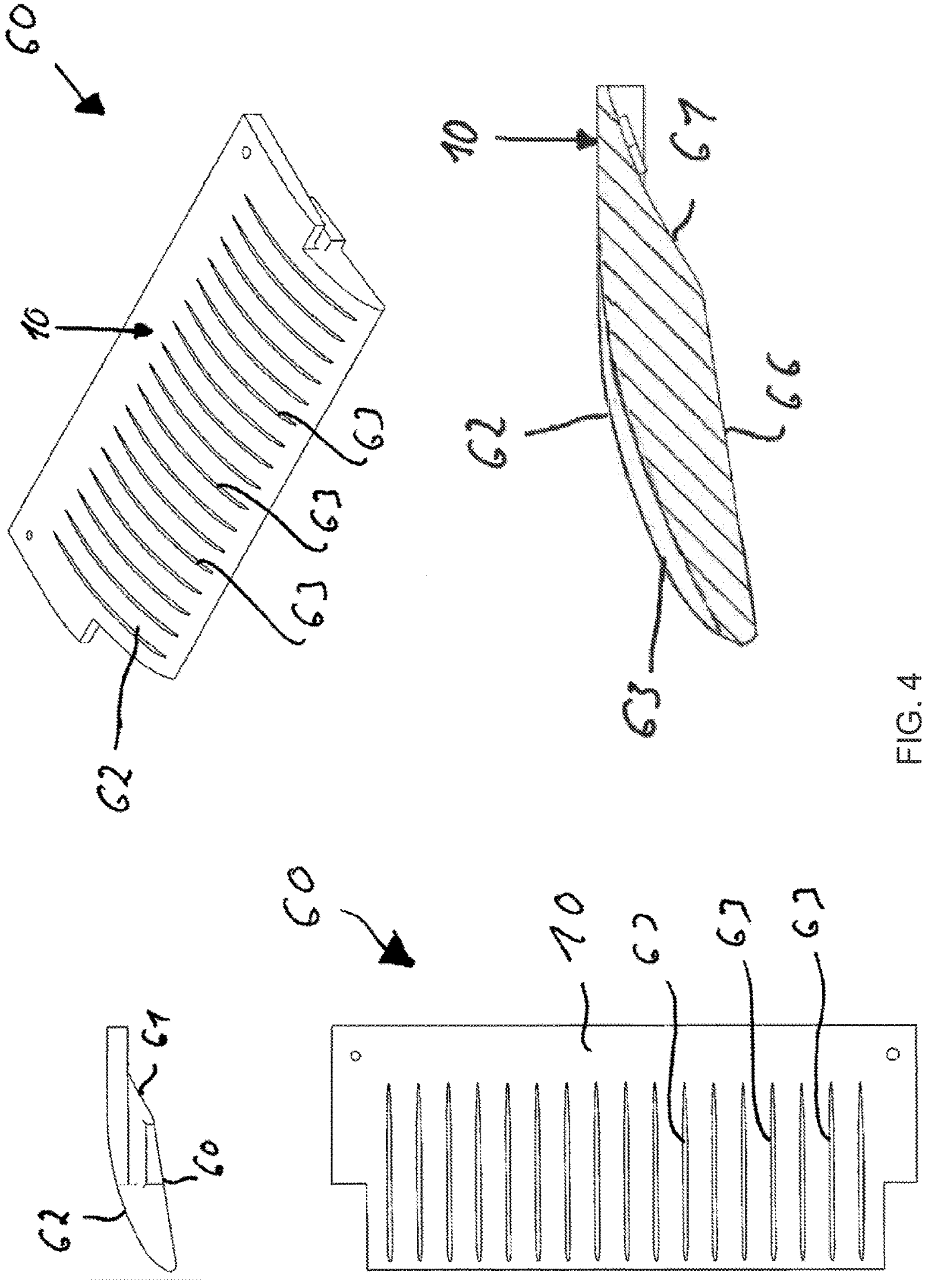
FIG. 4 shows several views and a sectional view of a grate segment.

The grate elements in FIG. 2 and FIG. 5 are different in the shape of the bottom sides of the grate segments 60: In FIGS. 2 to 4 the bottom sides 66 of the grate segments 60 are at least substantially flat, but inclined in the direction towards the support until they run over into the respective front sides 61 in rounded shape. This leads to the reduction of swirls in the area of the inlet 21 of the respective cooling air channel 20. In addition, the area of the transition from the rear side 62 to the bottom side 66 of the grate segments 60 forms a nose-shaped protrusion which splits up the cooling air flow coming from the rear and from below respectively. In the area of the inlets 21, that is in front of the nose-shaped protrusions, this leads to the pressure being approximately constant, which in turn leads to a significantly more uniform cooling air flow through the cooling air channels 20 arranged one after the other than in the prior art (see FIG. 7). This reduces the danger of formation of air tunnels.

In FIG. 4 longitudinal slits 63, open to the top, extend in conveying direction in the support of the grate segment 60. The longitudinal slits run from the rear side 62 of the grate segment 60 close to the front side end of the support 10. In assembled state these longitudinal slits 63 interact with the cooling air channel 20 formed by a front side 61 and a rear side 62 of two grate segments arranged one after the other. Consequently, cooling air from the cooling air channel 20 reaches the front area of the support 10 via the longitudinal slit 63. The width of the longitudinal slits 63 is dimensioned so that only a small fraction of particularly small clinker particles might drop into the longitudinal slit; these very small particles will be blown out of the longitudinal slit 63 by the cooling air. These longitudinal slits thus provide for a very effective cooling of the clinker bed. The transition from the rear side 62 of the grate segment 60 to the bottom of the longitudinal slit 63 is preferably steady, particularly preferably steadily curved. Thereby purging of the longitudinal slits 63 from clinker particles that might have entered is supported and the flow resistance reduced. Furthermore part of the cooling air stream follows the steady plane as is the case at the transition from the outlet 22 to the support 10. The transition of the bottom of the longitudinal slits 63 into the support is preferably steady, particularly preferable steadily curved for the same reasons. The depth of the longitudinal slits 63 preferably decreases in conveying direction, so that the flow speed inside the longitudinal slits 63 does not fall below a value required to reliably blow clinker particles out of the longitudinal slits 63, despite cooling air leaving the longitudinal slits upwards. The longitudinal slits 63 thus allow for an undisturbed transport of cooling air even into the front area of the support.

Figure 6:
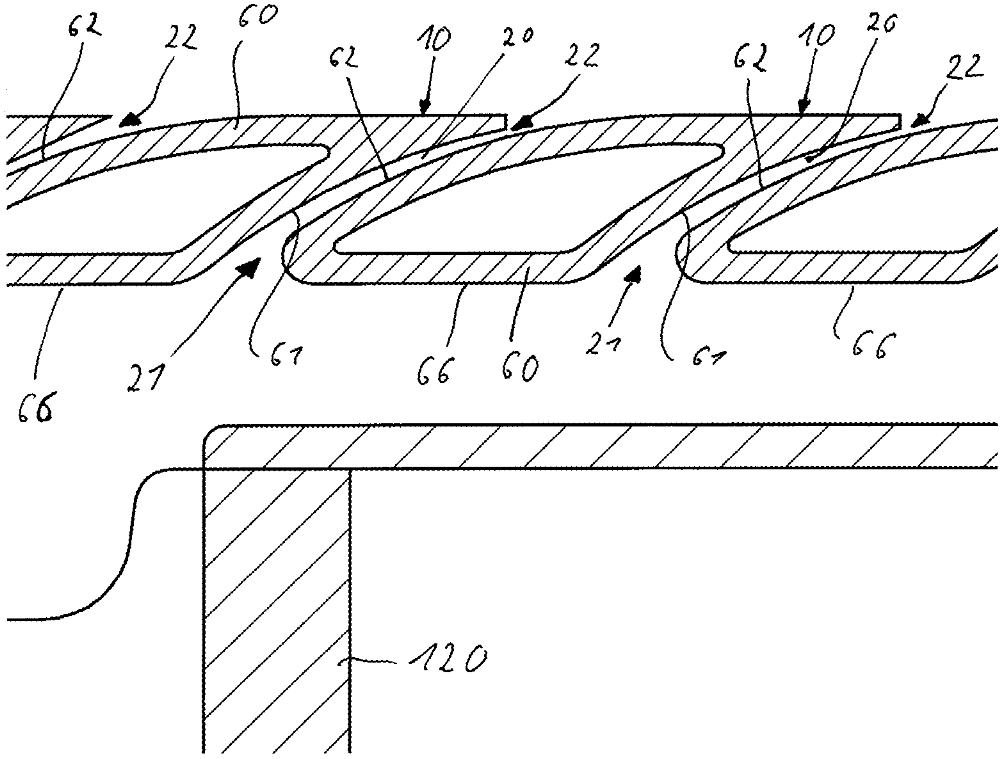
FIG. 6 shows a detail of FIG. 5.
Figure 7:
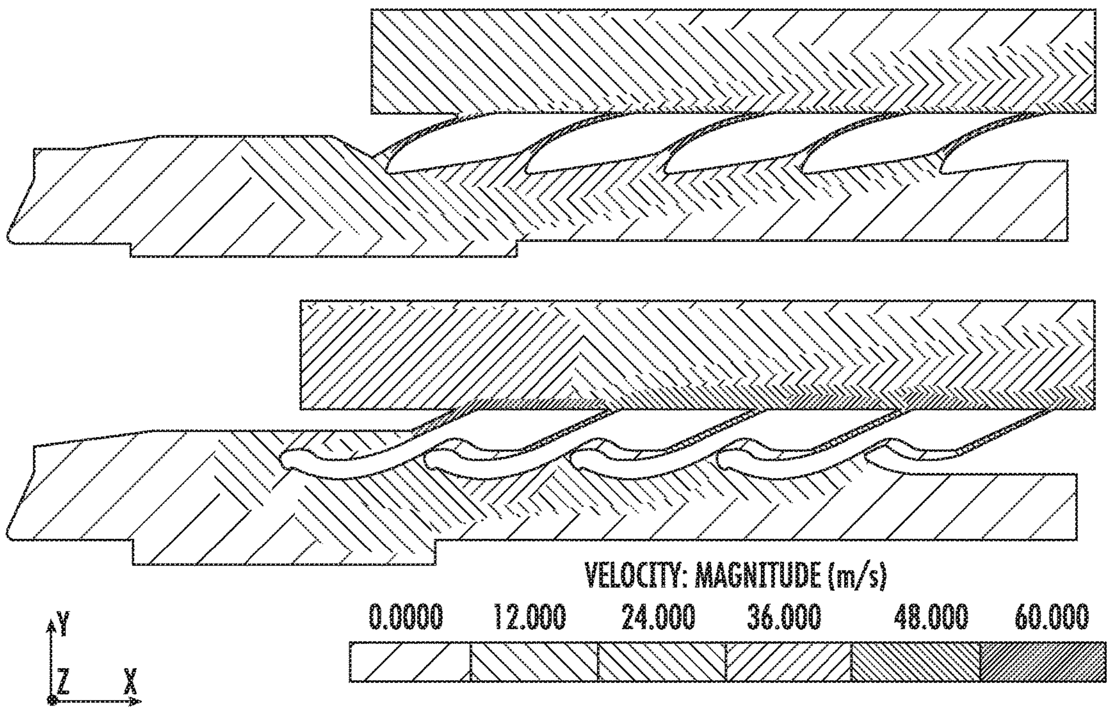
FIG. 7 shows the flow conditions inside a grate element according to FIG. 2 (above) in comparison to the flow conditions inside a known grate element (below).

The grate segments 60 depicted in FIGS. 5 and 6 are designed as hollow bodies thus reducing the amount of material used for their manufacture. The bottom sides 66 of these hollow bodies can of course also be designed inclined as depicted in FIGS. 2 to 4, so that the distance from the bottom side to the common plane made up by the flat sections of the support 10 decreases continuously to the point where the bottom side runs over into the front side 61 preferably steadily curved.

Usually the grate segments 60 are cast from metallic material. Alternatively they can also be made of ceramics or a compound material of steel and ceramics.

It will be appreciated to those skilled in the art having the benefit of this disclosure that this invention is believed to provide efficient cooling of cement clinker. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

1 grate element
2 conveying direction
3 cooling air supply
5 opening in the bottom side of a grate element
6 bottom side
7 upper side
10 support
20 cooling air channel
21 inlet
22 outlet
23 section adjacent to inlet 21
24 section adjacent to outlet 22
50 plate/plate-like final segment
51 front side of plate 50/plate-like final segment 50
60 grate segment
61 front side of grate segment 60
62 rear side of grate segment 60
63 longitudinal slit
66 bottom side of grate segment 60
70 front segment
72 rear side of front segment 70
100 cooling grate
120 air beam
120' air beam

The invention claimed is:

1. A cooling grate for cooling and transporting of cement clinker in a conveying direction, the cooling grate having multiple grate segments, wherein each of the multiple grate segments has an upper surface that consists of first and second surface portions and a lower surface that includes third and fourth surface portions, the first surface portion being parallel to the conveying direction and, in operation, providing support for cement clinker disposed on the cooling grate, the second surface portion being continuously curved in a plane that contains the conveying direction and that is perpendicular to the first surface portion such that the second surface portion tangentially merges into the first surface portion, the third surface portion being flat and inclined with respect to the first surface portion at a first non-zero angle, the fourth surface portion being continuously curved in the plane to form a second non-zero angle with respect to the first surface portion, the first and second non-zero angles being different;

wherein the cooling grate has multiple cooling air channels, a cooling air channel from said multiple cooling air channels being formed by two subsequent grate segments of the cooling grate, the two subsequent grate segments being immediately neighboring to one another, wherein said cooling air channel is defined between a second surface portion of a corresponding first grate segment of the two subsequent grate segments and a fourth surface portion of a corresponding second grate segment of the two subsequent grate segments, said cooling air channel being continuously curved in the plane, said cooling air channel having corresponding inlet and outlet and a length between said inlet and outlet, wherein the inlet is adjacent to both a third surface of the corresponding first grate segment and a third surface of the corresponding second grate segment and the outlet is adjacent to a first surface portion of the corresponding first grate segment to direct, in operation, a cooling air flow from the inlet along a vector lying in the plane and having (i) a first non-zero vector component that is perpendicular to the conveying direction and points from the lower surface to the upper surface, and (ii) a second non-zero vector component that is collinear with the conveying direction, and to output the cooling air flow from the outlet along the first surface portion of the corresponding first grate segment wherein a change in curvature of the second surface portion of the upper surface decreases along the length of said cooling air channel towards the first surface portion.

2. The cooling grate of claim 1, wherein at least one longitudinal slit extends in the upper surface of the at least one grate segment in the conveying direction, said at least one longitudinal slit having first and second walls that merge with one another to define a bottom of said slit, said at least one longitudinal slit being open to and in fluid communication with a cooling air channel at a top of said at least one longitudinal slit.

3. The cooling grate of claim 2, wherein a depth of the at least one longitudinal slit decreases along a length thereof in the conveying direction.

4. The cooling grate of claim 2, wherein said cooling air channel is devoid of a syphon section.

5. The cooling grate of one of the claim 2, wherein said bottom of the at least one longitudinal slit leads into the cooling air channel in a steadily curved manner such as to tangentially merge to a corresponding first surface portion.

6. The cooling grate of claim 1, wherein a curvature of the cooling channel decreases along the length of the cooling air channel in a direction towards the first surface portion.

7. The cooling grate of claim 1, wherein a distance between said upper surface of said first grate segment and the lower surface of said second grate segment is constant at least in a portion of the cooling air channel.

8. The cooling grate of claim 1, wherein a first cross-section of the cooling air channel defined at the inlet is bigger than a second cross-section of the cooling air channel defined at the outlet.

9. A cooling grate for cooling and transporting of cement clinker in a conveying direction, the cooling grate comprising an actuator;

at least one support for cement clinker, said at least one support being parallel to the conveying direction;

multiple cross-beams, each of the multiple cross-beams bearing multiple grate segments of the cooling grate, at least one cross-beam being operably connected with the actuator that is configured to move said at least one cross-beam parallel to said at least one support along the conveying direction; and on at least one cross-beam from said multiple cross-beams, a cooling air channel formed by at least two grate segments that are immediately neighboring to one another, said cooling air channel defined between an upper surface of a first grate segment and a lower surface of a second grate segment from said at least two grate segments, said cooling air channel having corresponding inlet and outlet and a length between said inlet and outlet, the outlet being adjacent to a support for cement clinker to direct, in operation, a cooling air flow from the inlet along a vector that (i) lies in a plane that contains the conveying direction and that is perpendicular to said support from the at least one support; (ii) has a first non-zero vector component that is perpendicular to the conveying direction and points from a lower surface of the first grate segment to the upper surface of said first grate segment and (iii) a second non-zero vector component that is collinear with the conveying direction, wherein a curvature of a portion of said cooling air channel decreases in a direction towards the at least one support, wherein a distance between said upper surface of the first grate segment and the lower surface of the second grate segment is constant at least in one portion of said cooling air channel, to output, in operation, the cooling air flow from the outlet along a support that is provided by said first grate segment.

10. The cooling grate of claim 9, further comprising at least one longitudinal slit in the upper surface of at least one grate segment, said at least one longitudinal slit extending in the conveying direction, said at least one longitudinal slit having first and second walls that merge with one another to define a bottom of said slit, said longitudinal slit being open to and in fluid communication with the cooling air channel at a top of said slit.

11. The cooling grate of claim 10, wherein a depth of the at least one longitudinal slit decreases along a length thereof in the conveying direction.

12. The cooling grate of claim 10, wherein said bottom of the at least one longitudinal slit leads into the cooling air channel in a steadily curved manner such as to merge to the surface of the at least one support.

13. A grate element for use with a cooling grate, the grate element comprising at least one support for cement clinker; and a cross-beam having a body with a hollow therethrough and upper and lower ends;

the grate element comprising multiple grate segments disposed above the upper end of the cross-beam within bounds thereof such that flat portions of upper surfaces of said multiple grate segments form said at least one support for cement clinker during operation of the cooling grate, the at least one support being parallel to a conveying direction of the cooling grate, wherein two subsequent grate segments that are immediately neighboring to one another define a cooling air channel between an upper surface of a first grate segment from the two subsequent grate segments and a lower surface of a second grate segment from the two subsequent grate segments to form multiple cooling air channels of the grate element;

each of said multiple cooling air channels having corresponding inlet and outlet and a length between said inlet and outlet, the outlet being adjacent to a flat portion of the upper surface of said first grate segment and fluidly connected with the lower end through a corresponding cooling air channel and said hollow and, wherein at least one of said multiple cooling air channels is continuously curved in a plane that contains the conveying direction and that is perpendicular to the at least one support to direct a cooling air flow to emerge, from an outlet of said at least one of said multiple cooling air channels, parallel to the at least one support, wherein a curvature of a portion of the at least one of said multiple cooling air channels decreases in a direction towards the at least one support, and wherein a distance between said upper surface of the first grate segment and the lower surface of the second grate segment is constant at least in one portion of the at least one of said multiple cooling air channels.

14. The grate element of claim 13, further comprising at least one longitudinal slit in the upper surface of at least one grate segment of the multiple grate segments, said at least one longitudinal slit extending in the conveying direction, said at least one longitudinal slit having first and second walls that merge with one another to define a bottom of said slit, said longitudinal slit being open to and in fluid communication with the cooling air channel at a top of said slit.

* * * * *